Aug. 5, 1958     R. W. GILBERT     2,846,648
ARC DROP VOLTMETER
Filed Sept. 26, 1955

ROSWELL W. GILBERT
INVENTOR.

BY
Rudolph J. Junick
ATTORNEY

:::::::::::::::::::::::::::::::::::::::::::::::::::::::::::::::::::::::::::::::::::::::::

United States Patent Office 2,846,648
Patented Aug. 5, 1958

2,846,648

ARC DROP VOLTMETER

Roswell W. Gilbert, Montclair, N. J., assignor, by mesne assignments, to Daystrom, Incorporated, Murray Hill, N. J., a corporation of New Jersey Application September 26, 1955, Serial No. 536,446

2 Claims. (Cl. 324—119)

This invention relates generally to voltmeter measuring instruments, and more particularly to voltmeter measuring instruments for determining the operating characteristics of gaseous rectifiers while in service operation.

In mercury-arc rectifiers having mercury-pool cathodes, a major parameter of the operating performance is the arc voltage drop. The total voltage drop from anode to cathode is usually considered as divided into three parts: the anode drop, the drop in the arc path, and the cathode drop. In large multi-anode single tank rectifiers, up to several thousand amperes rating, the voltage drop amounts to approximately 25 to 30 volts depending upon the geometry of the tube and on whether the vapor pressure is high or low, which in turn depends on the temperature of the tube.

Another problem to be considered with respect to gaseous tube operating characteristic measurements is the time duration of the forward conducting region of the rectifier operating characteristic to the inverse conducting region. Thus, the problem of arc drop measurement in a gaseous tube rectifier is to measure the forward arc voltage drop without influence of the relatively high inverse voltage and the time duration ratio. Among the most commonly employed methods of determining the arc drop are the use of an oscillograph, a modified vacuum-tube voltmeter, or the input and output method.

An object of this invention is the provision of a voltmeter for directly measuring the arc drop voltage of a gaseous rectifier.

Another object of my invention is to provide an arc drop voltmeter circuit suitable for directly measuring the arc drop of a gaseous rectifier in service operation.

A further object of my invention is to measure the forward voltage drop in the conduction region of gaseous rectifiers by means of a resistor-rectifier voltmeter circuit while the rectifier is in service operation.

A still further object of my invention is to measure the forward voltage drop of a gaseous rectifier by a resistor-rectifier voltmeter circuit whereby the inverse current flowing in the measuring circuit and the time duration ratio will not adversely affect the measurement.

In such circuit a rectifier, preferably a silicon diode, arranged in parallel with the measuring instrument shunts the reverse current flow from the measuring instrument; preferably a second such diode is also arranged in series with the measuring instrument to serve as a block to keep the reverse potential from the inductor pulsing diode.

With the foregoing and other objects in view, the invention resides in the following specification and appended claims, certain embodiments and details of construction of which are shown in the accompanying drawings in which;

Figure 3:
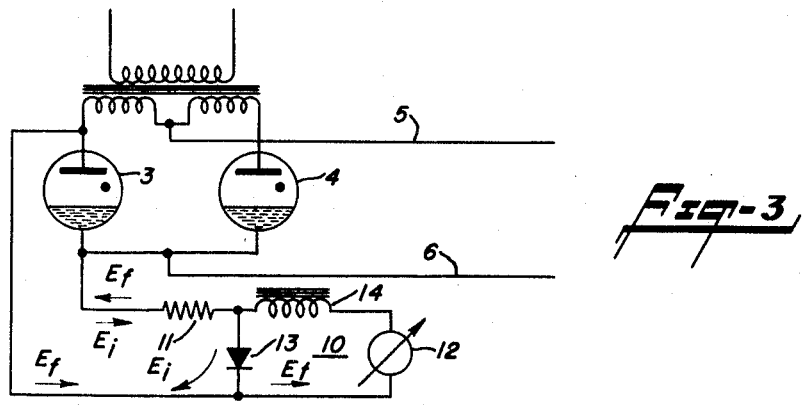
Figure 4:
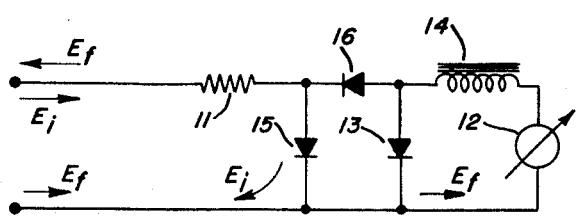

Figure 3 is a circuit diagram of a basic arc-drop voltmeter measuring circuit according to the invention attached to one element of a gaseous element full-wave rectifier circuit; and Figure 4 is a modified embodiment of a measuring circuit according to the invention which operates in a better manner to reduce the inverse current flow and thereby providing a more accurate measurement of the forward voltage drop in the conducting region of the gaseous rectifier.

Figure 1:
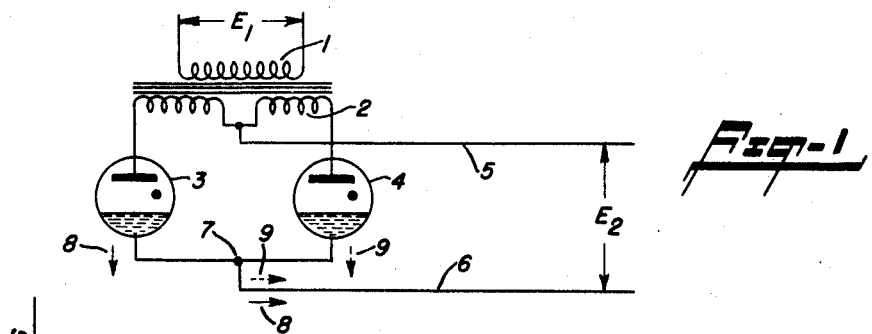
Figure 1 is a circuit diagram of a typical gaseous element full-wave rectifier circuit.

Referring now specifically to Figure 1, the A.-C. input voltage $E_1$ is applied to the primary winding 1 of a power transformer. The power is taken from the center-tapped secondary winding 2 where it is applied to the anodes of the gaseous element rectifiers 3 and 4. These gaseous element rectifiers may be mercury vapor rectifiers, such as ignitron, hot cathode, or the like. The D.-C. output voltage $E_2$ is the potential between line 5, connected to the center tap of the transformer winding 2, and line 6 which is connected to the cathode junction 7 of gaseous tubes 3 and 4. During the first half cycle of alternating input voltage $E_1$, tube 3 fires and the current flows to output line 6 as indicated by the solid arrow 8. Tube 4 acts as an open circuit, and no current flows in that branch of the circuit. During the next half cycle of alternating input voltage $E_1$, tube 4 fires and the current flows to output line 6 as indicated by the dotted arrow 9. Tube 3 at this time acts as an open circuit.

Figure 2:
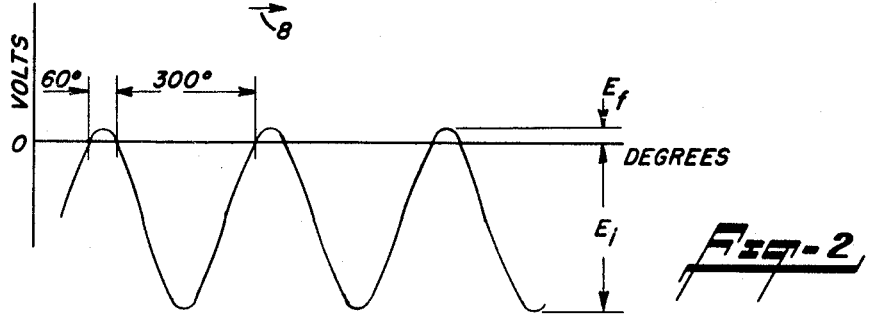
Figure 2 is a voltage waveform of a typical rectifier element operating in a six-phase system.

Figure 2 discloses the voltage waveform of a typical rectifier element operating in a six-phase system. In a six-phase system, the forward conducting region $E_f$ is slightly less than 60 electrical degrees in duration, and the reverse region is slightly more than 300 degrees, but the duration ratio cannot be considered constant. The problem of arc drop measurement is to measure the forward drop without influence of the relatively high inverse voltage and the time duration ratio. In a typical power system, the inverse voltage peak may often be as high as 1600 volts, and the time ratio may change by a factor of 2.

Figure 3 shows the basic arc-drop voltmeter circuit connected to measure the drop across the gaseous rectifier tube 3 of Figure 1. The circuit is essentially a half-wave crest ammeter circuit 10 and a voltmeter series resistor 11. The direction of current due to the low forward voltage is indicated by the arrow $E_f$ and the high inverse current is indicated by the arrow $E_i$. The half-wave crest ammeter is inherently unresponsive to the large inverse component $E_i$, which simply by-passes meter 12 through the shunt pulsing diode 13, which is preferably of the silicon diode type with a characteristically high reverse resistance. The small forward component $E_f$ is blocked by pulsing diode 13, and rams the inductor 14 with a potential crest sufficient to sustain an output current approaching equality with the crest level of the forward current. Thus, in operation, when tube 3 fires, the measuring current $E_f$ flows from anode to cathode through the measuring circuit, and the load current flows through this tube into the line 6. During the next half cycle, tube 4 fires in order to supply the load, and the inverse current $E_i$ flows through resistor 11 and through diode 13 thus by-passing the inductance 14 and meter 12. The circuit may take several cycles of time to reach a steady-state condition, and in the steady state the current flowing through the inductor and the instrument is substantially pure D.-C. having a level very close to the forward direct current.

The basic circuit of Figure 3 has the disadvantage that the inverse current $E_i$ flowing through the finite diode forward resistance presents an excessive burden to the meter inductor 14.. Thus, in a more preferred embodiment of my invention as shown in Figure 4, there are provided an additional shunt diode 15 to carry the major inverse current and a series blocking diode 16 intermediate the diodes 13, 15 to keep the inverse potential from the inductor pulsing diode 13. Consequently, diode rectifiers 13 and 15, which are poled so as to block flow of the forward component $E_f$, serve to divert the forward component $E_f$ into the meter 12, and diode rectifier 16 serves to block the inverse component $E_i$ from entering the meter 12. By using silicon diodes with their high reverse resistance characteristics, the system may be made independent of the inverse voltage to within an equivalent of about 0.01 microampere of instrument current.

Thus it will be seen that in the application of my invention, the arc-drop voltmeter will be connected across a gaseous rectifier which is in service operation. Since the voltmeter circuit is so designed that the meter will give an indication of an impressed voltage of a certain direction, while at the same time being unresponsive to an impressed voltage in the opposite direction, depending on how the measuring circuit is connected to the gaseous rectifier, the desired forward voltage or inverse voltage of a gaseous tube rectifier may be determined.

A major performance factor for successful operation of the measuring circuit is a sufficient time-constant in the inductor circuit. The ratio of the inductance to the loop resistance imposed by the inductor winding, the instrument and the forward drop of the blocking diode should be very high with respect to the time of inverse voltage application. For normal 60 cycle operation, a time-constant minimum of about one second is suggested, which calls for a rather large inductor. In a practical application of my invention, the instrument 12 has a sensitivity of 5,000 ohms/volt (200 microamperes), the diodes 13, 15 and 16 are type 1N138A, the series resistor has a value slightly less than 150,000 ohms, and the inductor 14 has an inductance of approximately 200 henrys and 100 ohms resistance. The inverse watts are approximately 10 watts at 1500 peak inverse voltage. My invention, however, is not to be construed as limited to a circuit with the values stated above.

From the above description it is seen that the invention provides a novel and practical means for accurately measuring the arc drop voltage of gaseous rectifiers in service operation. Moreover, while the specific embodiments are preferred, minor variations therein may be made without, however, departing from the spirit and scope of the invention as defined in the appended claims.

I claim:

1. Apparatus for measuring the arc drop voltage of a gaseous rectifier in service operation, said apparatus comprising a direct current indicating instrument having a pointer movable over a scale calibrated in volts; an inductor; a resistor; a series diode; leads connecting the said instrument, inductor, series diode and resistor in series across the anode and cathode of the gaseous rectifier, the polarity of said series diode being such that it conducts current when forward current flows through the gaseous rectifier; a first shunting diode connected across said leads and in shunt with both the instrument and the inductor; a second shunting diode connected across said leads and in shunt with the instrument, inductor, first shunting diode and the series diode, the polarity of the said two shunting diodes being such as to block the flow of current therethrough when forward current flows through the gaseous rectifier.

2. The invention as recited in claim 1, wherein the ratio of the inductance of said inductor to the total resistance of the inductor, instrument and forward resistance of the blocking diode is such that a time constant minimum of approximately one second is obtained.

References Cited in the file of this patent

FOREIGN PATENTS

| | | |
|---|---|---|
| 264,809 | Great Britain | Mar. 23, 1928 |
| 640,804 | Germany | Jan. 13, 1937 |
| 838,790 | Germany | June 30, 1952 |